United States Patent [19]
Sato et al.

[11] Patent Number: 5,557,929
[45] Date of Patent: Sep. 24, 1996

[54] CONTROL SYSTEM FOR INTERNAL COMBUSTION ENGINE EQUIPPED WITH EXHAUST GAS PURIFYING CATALYST

[75] Inventors: Ritsuo Sato, Atsugi City; Kimiyoshi Nishizawa, Yokohama City, both of Japan

[73] Assignee: Nissan Motor Co., Ltd., Yokohama City, Japan

[21] Appl. No.: 363,088

[22] Filed: Dec. 23, 1994

[30] Foreign Application Priority Data

Dec. 28, 1993 [JP] Japan ................................ 5-333908

[51] Int. Cl.⁶ ............................................ F01N 3/28
[52] U.S. Cl. ........................ 60/276; 60/277; 60/285
[58] Field of Search ............................ 60/276, 277, 285

[56] References Cited

U.S. PATENT DOCUMENTS 5,337,558 8/1994 Komatsu .................................... 60/277
5,357,754 10/1994 Ogawa ...................................... 60/285

FOREIGN PATENT DOCUMENTS 2-136538 5/1990 Japan.
4-17758 1/1992 Japan.

*Primary Examiner*—Douglas Hart
*Attorney, Agent, or Firm*—Lowe, Price, LeBlanc & Becker

[57] ABSTRACT

A control system for an internal combustion engine equipped with a catalytic converter including an exhaust gas purifying catalyst. The control system comprises a catalyst deterioration diagnosing device for diagnosing the deterioration condition of the catalyst. The operation of the catalyst deterioration diagnosing device is avoided when a first frequency at which an engine operating condition shifts to a range for stopping fuel supply to a fuel injector valve becomes larger by not less than a predetermined value than a second frequency at which the engine operating condition shifts to a range for increasing the amount of the fuel supply, thereby preventing the catalyst deterioration diagnosis from being carried out under a condition in which the catalyst is subjected to a high temperature and lean (air-fuel ratio) atmosphere.

16 Claims, 6 Drawing Sheets

CONTROL SYSTEM FOR INTERNAL COMBUSTION ENGINE EQUIPPED WITH EXHAUST GAS PURIFYING CATALYST

BACKGROUND OF THE INVENTION

1. Field of the Invention

This invention relates to improvements in a control system for an internal combustion engine equipped with an exhaust gas purifying catalyst, and more particularly to a technique for judging as to whether a diagnosis for deterioration of the catalyst is to be carried out or not under the action of a control unit.

2. Description of the Prior Art

Recently lowering the emission levels of noxious components (CO, HC, NOx and the like) of exhaust gas discharged from an internal combustion engine has been eagerly required from view points of environmental pollution. In view of this, a catalytic converter including an exhaust gas purifying catalyst is disposed in an exhaust gas passageway to purify exhaust gas by oxidizing or reducing the above noxious components thereby preventing the noxious components from being emitted to the atmosphere. However, such a catalytic converter is subjected to a high temperature under a reaction heat due to a catalytic reaction, and therefore there arise the following cases: Catalyst components sinter. A catalyst carrier overhears and is damaged. Additionally, the catalyst components are poisoned with impurities or the like contained in fuel or lubricating oil. As a result, there is the possibility that an initial exhaust gas purifying efficiency of the catalyst cannot be maintained and drops with time lapse, deteriorating the catalyst components. If the exhaust gas purifying catalyst is used under such a deteriorated condition, a large amount of the noxious components will be discharged to the atmosphere without being converted to harmless components. Accordingly, it has been eagerly required to carry out a diagnosis for the catalyst to know as to whether the catalyst deteriorates or not in order to previously prevent the noxious components from being emitted to the atmosphere.

Here, for the purpose of diagnosing the exhaust gas purifying catalyst, catalyst deterioration diagnosing devices have been proposed and put into practical use for internal combustion engines. Additionally, an air-fuel ratio feedback control system is well know and has been extensively used. The air-fuel ratio feedback control system includes two oxygen sensors which are provided respectively at the upstream and downstream sides of the exhaust gas purifying catalyst, in which a feedback control is made on an air-fuel ratio of air-fuel mixture to be supplied to the engine, in accordance with detected values of these oxygen sensors.

The catalyst deterioration diagnosing device in combination with the air-fuel ratio feedback control system is disclosed, for example, in Japanese Patent Provisional Publication No. 2-136538 and in Japanese Patent Provisional Publication No. 4-17758. The former diagnosing device of the Publication No. 2-136538 is arranged to make a catalyst deterioration diagnosis in accordance with a time duration from a time of re-opening of fuel injection to a time at which the downstream side oxygen sensor outputs a signal representative of a rich air-fuel ratio, after stopping fuel injection. The latter diagnosing device of the Publication No. 4-17758 is arranged as follows: The output levels of the upstream and downstream side oxygen sensors are memorized both at a fuel injection stopping condition and at a high engine load operating condition (or at a rich air-fuel ratio). A catalyst deterioration diagnosis is carried out by comparing these output levels and corresponding oxygen sensor output levels during the air-fuel ratio feedback control.

Now, exhaust gas purifying catalysts are temporarily lowered in capability when it is subjected to a high and lean (air-fuel ratio) atmosphere. In other words, the capability of such exhaust gas purifying catalysts are lowered but can be restored by allowing the catalysts to be subjected to a high and rich (air-fuel ratio) atmosphere.

However, the above-discussed conventional catalyst deterioration diagnosing devices never take account of the temporary capability lowering while a diagnosing condition (in which a catalyst deterioration diagnosis is made) is set in accordance with a response delay of the downstream side oxygen sensor relative to an output (air-fuel ratio) level change of the upstream side catalyst, owing to an oxygen storage effect of the exhaust gas purifying catalyst. Consequently, there is the possibility of making such an erroneous diagnosis that the exhaust gas purifying catalyst is assumed to be completely deteriorated even though the capability of the catalyst temporarily lowers.

SUMMARY OF THE INVENTION

It is an object of the present invention to provide an improved control system for an internal combustion engine, which can effectively overcome drawbacks encountered in conventional similar control system in connection with a catalyst deterioration diagnosing device.

Another object of the present invention is to provide an improved control system for an internal combustion engine, which can accurately diagnose the deterioration of an exhaust gas purifying catalyst thereby preventing an environmental pollution with exhaust gas discharged from an internal combustion engine.

A further object of the present invention is to provide an improved control system for an internal combustion engine, in which a catalyst deterioration diagnosis can be avoided in case that an exhaust gas purifying catalyst is in a condition to be temporarily lowered in capability.

A control system according to the present invention is for an internal combustion engine provided with an exhaust gas purifying catalyst in an exhaust gas passageway of the engine. The control system comprising first means for diagnosing a deterioration of the catalyst, when operated. Second means is provided to detect a predetermined engine operating condition at which a temperature of the catalyst becomes high. Third means is provided to calculate a first rate at which a control for stopping fuel to be supplied to the engine is made. Fourth means is provided to calculate a second rate at which a control for increasing an amount of fuel to be supplied to the engine is made. Fifth means is provided to avoid an operation of the diagnosing means when a deviation between the first and second rates becomes not less than a predetermined value under the predetermined engine operating condition.

With the thus arranged control system, even though engine operation falls in a predetermined condition for accomplishing a catalyst deterioration diagnosis, the diagnosis can be avoided when the deviation between the first rate at which the control for stopping the fuel supply is made and the second rate at which the control for increasing the amount of the fuel supply is made becomes not less than the predetermined value under the engine operating condition in which the temperature of the catalyst becomes high. Accordingly, an accurate judgment can be made as to whether the catalyst deterioration diagnosis is carried out or not. In other words, the catalyst deterioration diagnosis can be effectively avoided under the engine operating condition in which the catalyst is subjected to a high temperature and lean (air-fuel ratio) atmosphere, thereby preventing a misjudgment of the temporary catalyst capability lowering as a complete deterioration (permanent capability lowering) of the catalyst.

DETAILED DESCRIPTION OF THE INVENTION

Figure 1:
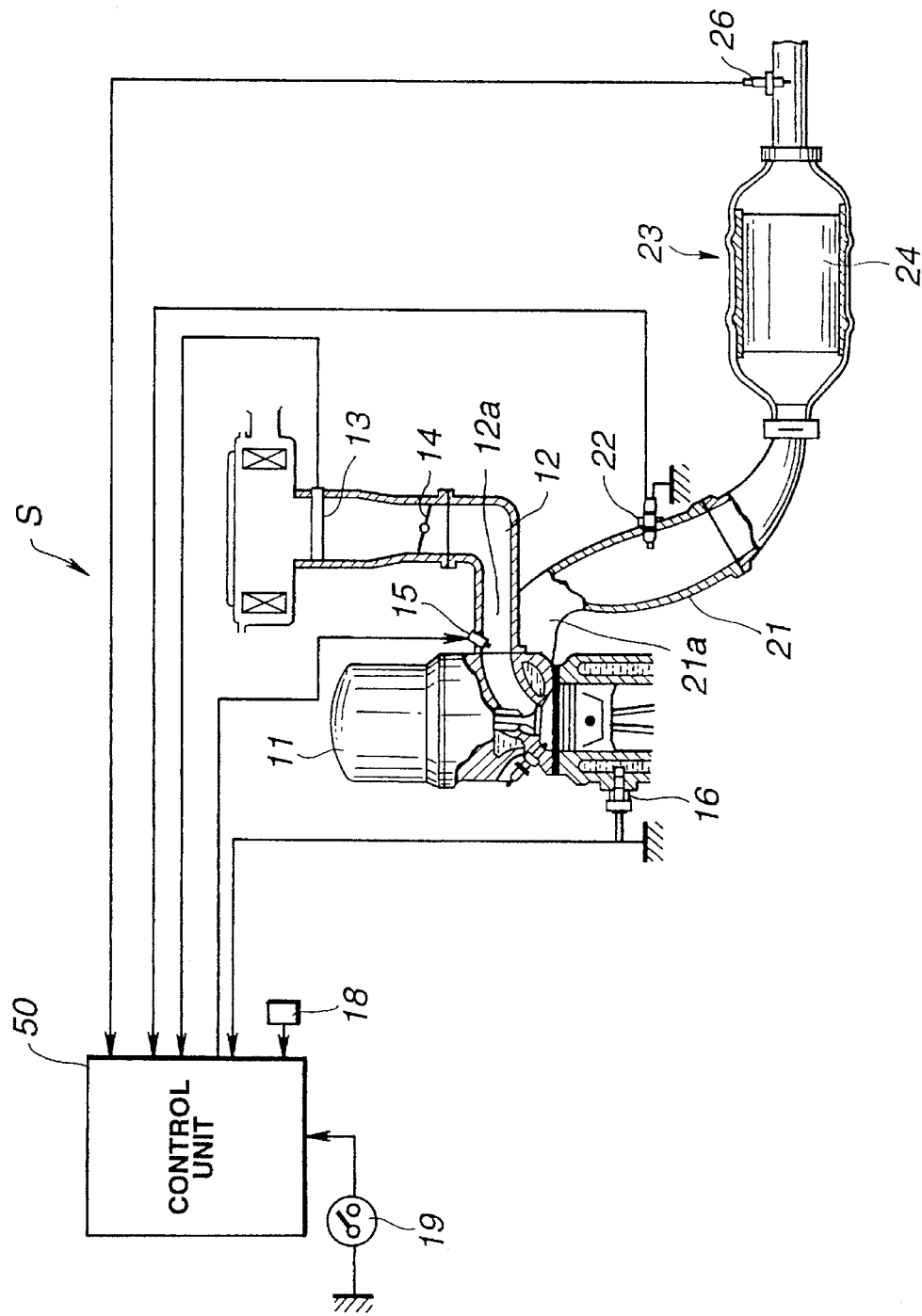
FIG. 1 is a schematic illustration of an embodiment of a control system for an internal combustion engine, according to the present invention.

Referring now to FIG. 1 of the drawings, an embodiment of a control system for an internal combustion engine 11, according to the present invention is illustrated by the reference character S. The internal combustion engine 11 is provided with an intake air passageway 12 through which intake air is inducted into the engine 11. An airflow meter 13 is provided in the intake air passageway 12 to detect an intake air flow amount Q (the amount of intake air flowing through the intake air passageway 12). A throttle valve 14 is provided in the intake air passageway 12 and is adapted to rotatably movable in relation to an accelerator pedal (not shown) to control the intake air flow amount Q. The downstream portion of the intake air passageway 12 is formed in an intake manifold (not identified) and therefore diverges to have a plurality of diverged passages 12a each of which is formed in a branch runner of the intake manifold as shown in FIG. 1. An electromagnetically operated fuel injector valve 15 is disposed in each diverged passage 12a to inject fuel into the diverged passage 12a at a position near the engine 11.

The fuel injector valve 15 is operated to open in accordance with a pulse signal (for injection) output from a control unit 50 including a microcomputer. The fuel injector valve 15 is supplied with fuel under pressure, from a fuel pump (not shown). The fuel to be supplied to the fuel injector valve 15 is regulated to a predetermined pressure level under the action of a pressure regulator (not shown). Thus, the fuel injector valve 15 injects fuel under pressure into the downstream portion of the intake air passageway 12 to form an air-fuel mixture to be supplied to engine cylinders (not shown) of the engine 11. Additionally, a coolant temperature sensor 16 is provided in a coolant jacket (not identified) of the engine 11 to detect a coolant temperature Tw (the temperature of engine coolant in the coolant jacket).

A crank angle sensor 18 is disposed in an ignition distributor (not shown) of the engine 11 to output a crank unit angle signal every a unit angle of a crankshaft (not shown) of the engine, in timed relation to engine revolution. An engine speed Ne of the engine is detected by counting the crank unit angle signal for a predetermined time. The engine speed Ne may be detected by measuring a time interval of a crank standard signal which is generated every a standard angle of the rotating crankshaft.

The engine 11 is provided with an exhaust gas passageway 21 whose upstream portion is formed in an exhaust manifold (not identified) and therefore diverges to have a plurality of exhaust gas passages 21a. Each exhaust gas passage 21a is formed in a branch runner of the exhaust manifold. A first air-fuel ratio sensor 22 is disposed in the exhaust gas passageway 21 downstream of the converged portion of the exhaust gas passages 21a to detect an oxygen concentration in the exhaust gas in the exhaust gas passageway 21 thereby detecting an air-fuel ratio in air-fuel mixture to be supplied to the engine 11.

A catalytic converter 24 is disposed in the exhaust gas passageway 21 downstream of the first air-fuel ratio sensor 22 and includes a three-way catalyst 24 for oxidizing CO and HC (hydrocarbons) and reducing NOx (nitrogen oxides). The three-way catalyst 24 is made of ceramic and of the monolithic type such as honeycomb-shape. The three-way catalyst 24 may be made of metal (such as stainless steel) or of the ceramic-pellet type. Although only the three-way catalyst 24 has been shown and described to be used in this embodiment, it will be understood that the catalyst 24 may be replaced with an oxidizing catalyst or another catalyst. A second air-fuel ratio sensor 26 which has the same function as the first air-fuel ratio sensor 22 is disposed in the exhaust gas passageway 21 downstream of the three-way catalyst 24. A start switch 19 is provided to a key or ignition switch (not shown) disposed in a passenger compartment of the vehicle. The start switch 19 is adapted to output a start signal representative of engine starting, to the control unit 50.

The control unit 50 functions to calculate a basic fuel injection amount Tp in accordance with the intake air flow amount Q and the engine speed Ne, and to calculate an air-fuel ratio feedback correction coefficient $\alpha$ under a proportional-plus-integral control so as to cause the air-fuel ratio detected by the first air-fuel ratio sensor 22 to approach a target air-fuel ratio (stoichiometric air-fuel ratio) thereby accomplishing an air-fuel ratio feedback control. The basic fuel injection amount Tp is corrected with the air-fuel ratio feedback correction coefficient $\alpha$, a variety of correction coefficients COEF, a voltage correction amount Ts (a correction amount depending upon a voltage change of a battery) and the like, thus obtaining a fuel injection amount Ti (=Tp$\times\alpha\times$COEF$\times$Ts). The fuel injector valve 15 is controlled to be operated in accordance with this fuel injection amount Ti.

The second air-fuel ratio sensor 26 detects a shift in control point of the air-fuel ratio feedback control made under the action of the first air-fuel ratio sensor 22. A proportional operation amount used in a proportional control of the air-fuel ratio feedback correction coefficient $\alpha$ is corrected in accordance with the detected result of the shift obtained by the second air fuel ratio sensor 26. It will be understood that such a correction control using the second air-fuel ratio sensor 26 is not limited to the above-mentioned correction of the proportional operation amount and therefore may be other various known correction controls.

The control unit 50 further functions to diagnose deterioration of the three-way catalyst 24 in accordance with the outputs of the first and second air-fuel ratio sensors 22, 26. Such diagnosing the deterioration of the three-way catalyst 24 is known and therefore may be carried out in accordance with a time duration between a time of re-opening of fuel injection from the fuel injector 15 after fuel-cut of the fuel injector valve 15 and a time at which the second air-fuel ratio sensor 26 outputs a signal representative of a rich air-fuel ratio (rich in fuel relative to the stoichiometric air-fuel ratio). Otherwise, the diagnosing the deterioration of the three-way catalyst 24 may be carried out as follows: The output levels of the first and second air-fuel ratio sensors 22, 26 during fuel-cut of the fuel injector valve and the output levels of them 22, 26 during a high load engine operation (in the rich air-fuel ratio) are memorized in the control unit 50; and these output levels are compared with an output level of the air-fuel ratio sensor under the air-fuel ratio feedback control.

Thus, the control unit 50 functions to diagnose the deterioration of the three-way catalyst 24.

Here, a discussion will be made on a deterioration diagnosis avoiding judgment program for judging as to whether a deterioration diagnosis for the three-way catalyst 24 should be carried out or avoided, with reference to flowcharts of FIGS. 2 to 5. The programs of FIGS. 2 to 5 are executed mainly under the action of the control unit 50.

Figure 2:
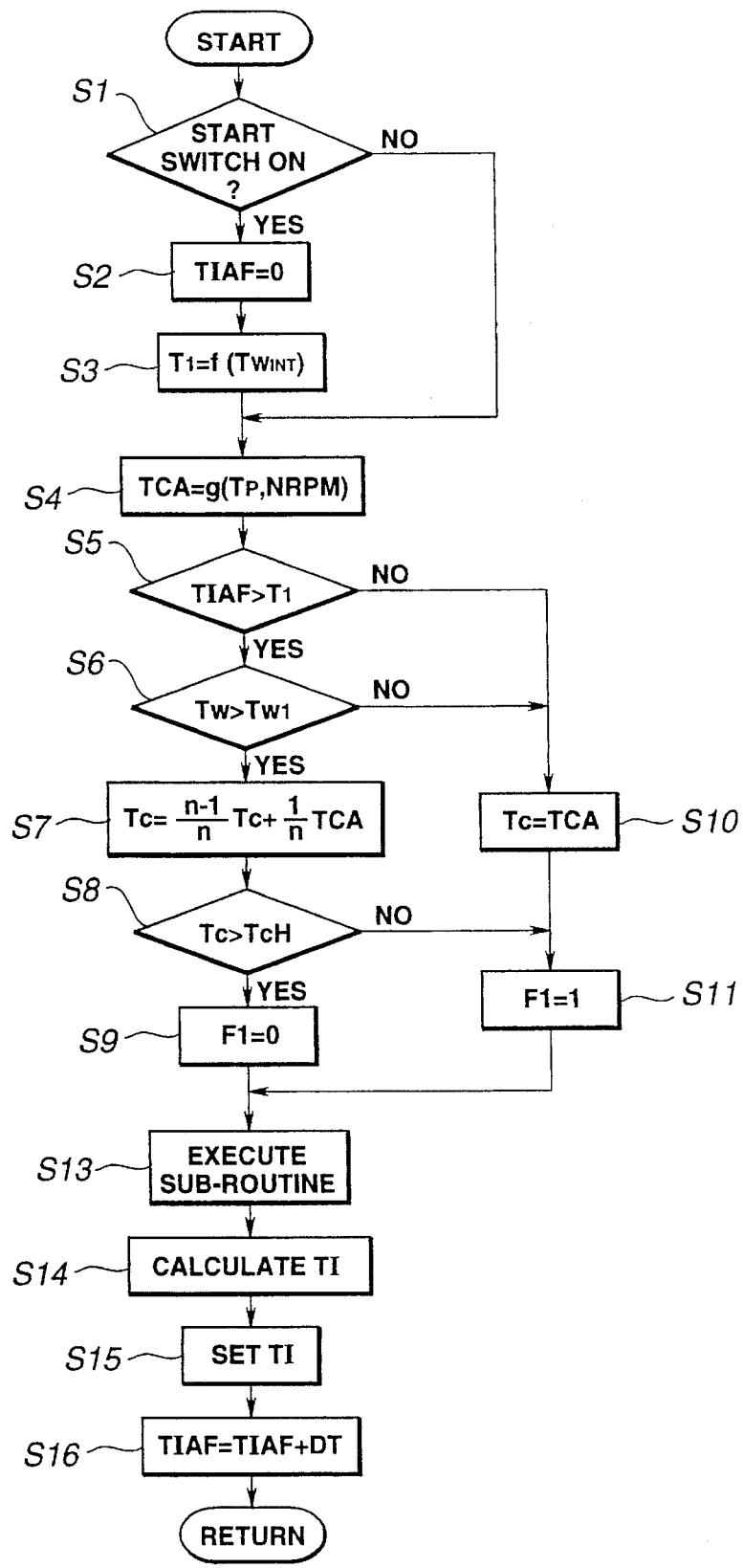
FIG. 2 is a flowchart of a main routine of a catalyst deterioration diagnosis avoiding judgment program used in a control of the control system of FIG. 1.

The flowchart of FIG. 2 is a main routine of the deterioration diagnosis avoiding judgment program and is executed every a predetermined time.

At a step S1, a judgment is made as to whether the start switch 19 is turned ON or not. In case of YES, starting of the engine 11 is judged to be initiated and a flow goes to a step S2 at which a timer is reset to make a counted value (counted time) TIAF zero. In case of NO, the flow directly goes to a step S4.

Figure 6:
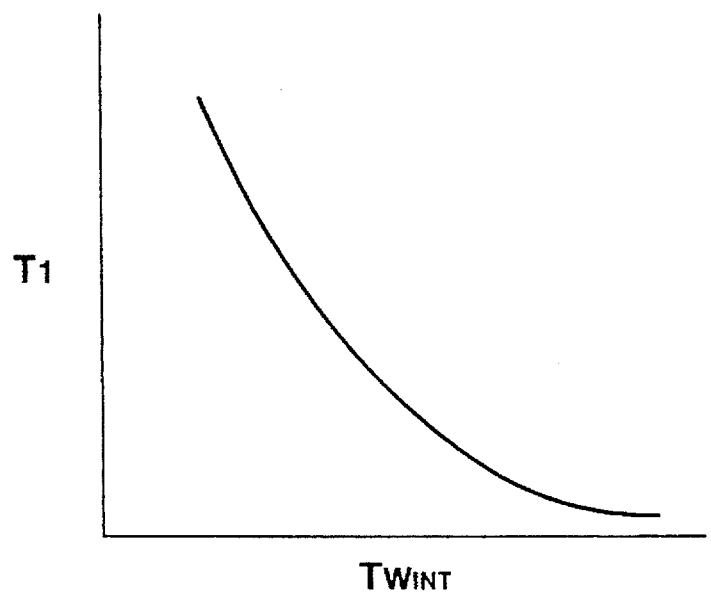
FIG. 6 is a graph showing the characteristics of a warming-up time T1 of a catalyst, in connection with the above embodiment of the control system according the present invention.

At a time immediately after the engine starting, the temperature of an exhaust system including the exhaust gas passageway 21 is low, and therefore the temperature in the catalytic converter 23 including the three-way catalyst 24 is low. Accordingly, at a step S3, a warming-up time $T_1$ for the three-way catalyst 24 is searched. Here, an engine temperature can be represented by the coolant temperature Tw of the engine coolant in the coolant jacket in the engine 11, and therefore the coolant temperature $Tw_{INT}$ at the time immediately after the engine starting is detected by the coolant temperature sensor 16. Then, the warming-up time $T_1$ is obtained in accordance with the coolant temperature $Tw_{INT}$, from a map. As shown in FIG. 6, the warming-up time $T_1$ is shorter as the coolant temperature $Tw_{INT}$ at the time immediately after the engine starting is higher.

Figure 7:
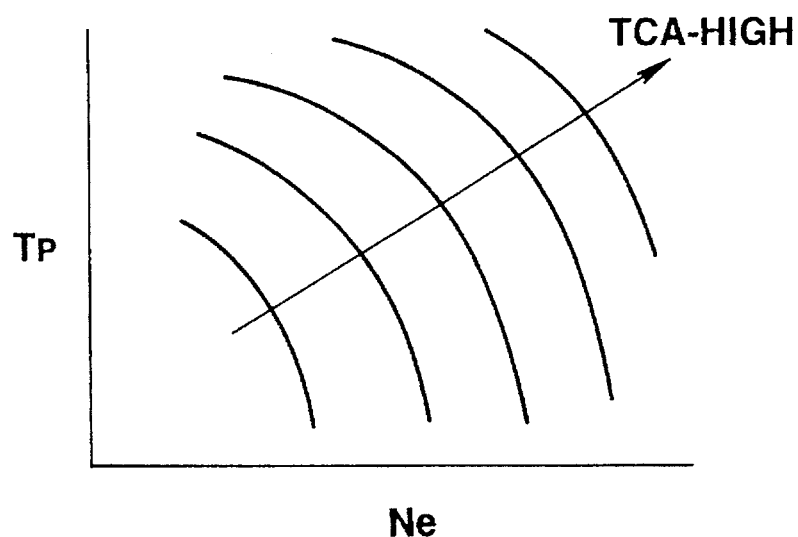
FIG. 7 is a graph showing the characteristics of a catalytic converter temperature TCA in connection with the above embodiment of the control system according to the present invention.

At a step S4, the temperature (an inlet exhaust gas temperature TCA) of the catalytic converter 23 at an exhaust gas inlet is obtained during a steady state operation of the engine. Here, the inlet exhaust gas temperature TCA can be obtained in accordance with the basic fuel injection amount Tp (as an engine load) and the engine speed Ne, from a map. As shown in FIG. 7, the inlet exhaust gas temperature TCA is higher as the basic fuel injection amount Tp is larger and the engine speed Ne is higher.

At a step S5, a judgment is made as to whether the counted value (counted time) TIAF of the timer has become larger than the warming-up time T1 for the three-way catalyst 24, obtained at the step S3 or not. The counted value TIAF is representative of a lapsed time after turning-ON of the start switch 19.

At a step S6, a judgment is made as to whether the coolant temperature Tw of the engine coolant in the coolant jacket of the engine 11 becomes higher than an engine warming-up temperature $Tw_1$ or not. In case of $TIAF > T_1$ and $Tw > Tw_1$, it is assumed that the engine 11 has been operated for a time longer than the warming-up time $T_1$ of the three-way catalyst 24 after the start switch 19 was turned ON, and the temperature of the engine coolant in the coolant jacket of the engine 11 has reached the engine warming-up temperature so that the warming-up of the engine 11 has been completed. As a result, the flow goes to a step S7.

At the step S7, it is assumed that there is the possibility of the three-way catalyst 24 becoming high in temperature at this engine operating condition. Accordingly, a catalyst temperature Tc (the temperature of the three-way catalyst 24) is to be estimated. Here, the catalyst temperature Tc of the three-way catalyst 24 changes with a change in engine operating condition, in which, for example, the change in the catalyst temperature Tc is assumed to delay relative to the change in engine operating condition. Accordingly, the catalyst temperature Tc calculated at a prior time and the exhaust gas temperature TCA are subjected to a treatment of weighted mean thereby to obtain a value which is renewed and memorized as the catalyst temperature Tc [$=(n-1)/n \times Tc+(1/n) \times TCA$].

At a step S8, a judgment is made as to whether the estimated catalyst temperature Tc is higher than a predetermined catalyst temperature TcH or not, thereby knowing the catalyst temperature Tc of the three-way catalyst 24 is high or not. In case of the judgment result of Tc>TcH, it is assumed that the catalyst temperature Tc is higher than the predetermined temperature TcH, and the engine operating condition is within a three-way catalyst high temperature region at which the three-way catalyst is high in temperature. Consequently, the flow goes to a step S9. At a step S9, "0" is set at an engine operating condition flag F1 for indicating as to whether the engine operating condition is within the three-way catalyst high temperature range, and memorized. In case of judgment result of Tc≦TcH, it is assumed that the catalyst temperature Tc is not higher than the predetermined temperature TcH, and the engine operating condition is not within the three-way catalyst high temperature region. As a result, the flow goes to a step S11 at which "1" is set at the engine operating condition flag F1 and memorized. In other words, in case of F1=0, the engine operating condition is within the range at which the temperature of the exhaust gas treatment catalyst becomes high, whereas in case of F1=1, the engine operating condition is not within the same range.

In case that the judgment result is TIAF≦$T_1$ at the step S5 or in case that the judgment result is Tw≦$Tw_1$ at the step S6, it is assumed that the engine operating condition is within a range at which there is no possibility of the three-way catalyst 24 becoming high in temperature. Accordingly, the flow goes to a step S10 at which the catalyst temperature Tc of the three-way catalyst 24 is represented by the inlet exhaust gas temperature TCA of the catalytic converter 23 in the steady state engine operation (Tc=TCA). Thereafter, the flow goes to a step S11.

At the above-discussed steps 1 to 11, the engine operating condition in which the exhaust gas treatment catalyst becomes high in temperature is detected.

Next, at a step S13, a deterioration diagnosis avoiding judgment sub-routine for judging as to whether a deterioration diagnosis for the three-way catalyst 24 should be carried out or avoided is carried out, which will be discussed after with reference to FIG. 3 or FIGS. 4 and 5.

At a step S14, the fuel injection amount Ti (=Tp×α× COEF×Ts) is calculated by correcting the basic fuel injection amount Tp with the air-fuel ratio feedback correction coefficient α, the correction coefficients COEF, the voltage correction amount Ts, and the like.

At a step S15, the fuel injection amount Ti calculated at the step S14 is set at an output register (not shown). As a result, at a predetermined fuel injection timing in timed relation to engine revolution, the pulse signal having a pulse width corresponding to the calculated fuel injection amount Ti is supplied to the fuel injector valve 15, so that fuel is injected from the fuel injector valve in response to the pulse signal.

At a step S16, the counted value TIAF (corresponding to the lapsed time after turned-ON of the start switch 19) of the timer is counted up by Dt (TIAF=TIAF+DT), and then the main routine is terminated to be returned.

Next, an example of the deterioration diagnosis avoiding judgment sub-routine of the deterioration diagnosis avoiding judgment program will be discussed with reference to a flowchart of FIG. 3.

At a step S21, a judgment or control condition is made as to whether the engine operating condition is within a range at which the air-fuel ratio feedback control is to be carried out, or not. If the engine operating condition is within the range, the judgment result is YES and then a flow goes to a step S22. At the step S22, "0" is reset at a rich frequency count flag F2 which will be discussed in detail after, thereby making it possible to count the frequency of occurrence of the rich air-fuel ratio.

At a step S23, "0" is reset at a lean frequency count flag F3 which will be discussed in detail after, thereby making it possible to count the frequency of occurrence of a lean air-fuel ratio which is lean in fuel relative to the stoichiometric air-fuel ratio.

At a step S24, the air-fuel ratio feedback correction coefficient α is calculated under a proportional-plus-integral control so as to cause the air-fuel ratio detected by the first air-fuel ratio sensor 22 to approach the target air-fuel ratio (stoichiometric air-fuel ratio) thereby accomplishing the air-fuel ratio feedback control. Thereafter, the flow is terminated.

At the step 21, if the judgment result is that the engine operating condition is not within the range at which the air-fuel ratio feedback control is to be carried out (or in case of the judgment result of NO), it is assumed that it is possible to judge a diagnosis condition under which diagnosing the deterioration of the three-way catalyst is carried out, and the flow goes to a step S25. At the step S25, a judgment is made as to whether the engine operating condition flag F1 is F1=0 or not. In case of F1=0, it is assumed that the engine operating condition is within the range at which the temperature of the three-way catalyst 24 becomes high. Accordingly, the flow goes to a step S26.

At the step S26, a judgment is made as to whether the engine operating condition or control condition is within a fuel increasing region (for increasing the amount of fuel supply to the fuel injector valve 15) or not in accordance with the basic fuel injection amount Tp (as the engine load) and the engine speed Ne. In case of the judgment result of being within the fuel increasing region (or in case of YES), the flow goes to a step S27 at which F3=0 is reset at the lean frequency count flag F3 which indicates as to whether count is to be made on the change in the control condition shifting to a range for stopping fuel supply to the fuel injector valve 15 is made, or not. The case of F3=0 represents that the present control condition is not within the range for stopping fuel supply to the fuel injector valve 15, and that when the present control condition shifts into the above range, counting the frequency of the control condition shifting into the above range is made. The case of F3=1 represents that the present control condition is within the range for stopping the fuel supply fuel to the fuel injector valve 15, and that even though the control condition after shifting is within the above range, the control condition within the above range is assumed to continue and therefore the present control condition is not counted as the frequency of the control condition shifting.

At a step S28, a judgment is made as to whether the rich frequency count flag F2 (for indicating as to whether count is made on the change in a control condition shifting to a range for increasing the amount of fuel supply to the fuel injector valve 15, or not) is at F2=0 or not. The case of F2=0 represents that the present control condition is not within the range for increasing the amount of the fuel supply to the fuel injector valve 15, and that when the present control condition shifts into the above range, counting the frequency of control condition shifting into the above range is made. The case of F2=1 represents that the present control condition is within the range for increasing the amount of fuel supply, and that even though the control condition after shifting is within the above range, the control condition within the above range is assumed to continue and therefore counting the present control condition is not made as the frequency of the control condition shifting is not made.

Accordingly, in case of the judgment result of F2=0, counting the frequency of the control condition shifting into the above range for increasing the amount of fuel supply is made, and therefore the flow goes to a step S29 at which a decrement in a frequency count value (a counted value of the frequency of the control condition shifting) NLR is made by 1 (NLR=NLR−1). In other words, at the step S29, the frequency of the control condition shifting to the range for increasing the amount of the fuel supply (as a period at which the control for increasing the amount of the fuel supply is made) is counted, and therefore the rate at which the control for increasing the amount of the fuel supply is made is calculated.

At a step S30, the control condition for increasing the amount of the fuel supply is continuing, and therefore the present control condition is within the range for increasing the amount of the fuel supply. Since the frequency of the control condition shifting to the range was counted at the step S29, F2=1 is set at the rich frequency count flag F2 to prevent counting the present control condition as the frequency of the control condition shifting to the range for increasing the amount of the fuel supply.

At the step S26, in case of the judgment result of the engine operating condition being not within the fuel increasing region or range for increasing the amount of the fuel supply (or in case of NO), the flow goes to a step S31 at which a judgment is made as to whether the control condition is within a range for stopping fuel supply to the fuel injector valve 15 or not in accordance with the basic fuel injection amount Tp (as the engine load) and the engine speed Ne. In case of the judgment result of the present control condition being within the range for stopping the fuel supply, the flow goes to a step S32 at which the present control condition is not within the range for increasing the amount of the fuel supply, and therefore when the present control condition shifts to the range for increasing the amount of the fuel supply, F2=0 is set at the rich frequency count flag F2 to count the frequency of the control condition shifting to the range for increasing the amount of the fuel supply.

At a step S33, a judgment is made as to whether the lean frequency count flag F3 is at F3=0 or not to know whether the frequency of the control condition shifting to the range for stopping the fuel supply should be counted or not. In case of the judgment result of F3=0, counting the frequency of the control condition shifting to the range for stopping the fuel supply is to be made, and therefore the flow goes to a step S34 at which an increment by 1 is made on the frequency count value NLR (NLR=NLR+1). In other words, at the step S34, the frequency of the control condition shifting to the range for stopping the fuel supply (as a period at which the control for stopping the fuel supply is made) is counted, and therefore the rate at which the control for stopping the fuel supply is made is calculated.

At a step S35, the present control condition is within the range for stopping the fuel supply, and the frequency of the control condition shifting to the range was counted at the step S35. Accordingly, F3=1 is set at the lean frequency flat F3 in order to prevent counting the present control condition as the frequency of the control condition shifting to the range for stopping the fuel supply. In other words, as shown in steps S29 and S34, the decrement by 1 is made on the frequency count value NLR in case that the control condition shifts from other ranges to the range for increasing the amount of the fuel supply; and the increment by 1 is made on the same in case that the control condition shifts from other ranges to the range for stopping the fuel supply.

At the step S25, in case of the judgment result of F1=1, it is assumed that the engine operating condition is not within a range at which the temperature of the three-way catalyst 24 becomes high, and therefore the temperature is assumed to become high in the future. In case of the judgment result of the present control condition is within the range for stopping the fuel supply (or in case of NO) at the step S31, since the present control condition is not within the range for increasing the amount of the fuel supply and not within the range for slopping the fuel supply, and therefore there are possibilities of increasing the amount of the fuel supply and of stopping the fuel supply in the future. As a result, the flow goes to a step S36 at which F2=0 is set at the rich frequency count flag F2. Additionally, at a step S37, F3=0 is set at the lean frequency count flag F3.

At a step S38, a judgment is made as to whether the frequency count value NLR upon decrement at the step S29 or upon increment at the step S34 is NLR>NLRM (NLRM is a predetermined value) or not. In case of YES, the flow goes to a step S39 at which "0" is set at a catalyst deterioration diagnosis avoiding flag F4. In case of NO, the flow goes to a step S40 at which "1" is set at the catalyst deterioration diagnosis avoiding flag F4.

Here, in case of F4=0 at the catalyst deterioration diagnosis avoiding flag F4, the frequency of the control condition shifting to the range for stopping the fuel supply is larger by not less than the predetermined value NLR than the frequency of the control condition shifting to the range for increasing the amount of the fuel supply under the engine operating condition in which the temperature of the three-way catalyst 24 becomes high. In other words, in such a case, the three-way catalyst 24 is high in temperature and subjected to a lean atmosphere (having a lean air-fuel ratio relative to the stoichiometric air-fuel ratio), in which the capability of the three-way catalyst 24 is temporarily lowered. However, such a capability lowering is merely temporary, so that the capability of the three-way catalyst can be restored by exposing the three-way catalyst 24 to a high temperature and rich atmosphere (having a rich air-fuel ratio relative to the stoichiometric air-fuel ratio). It will be understood that if the diagnosis for deterioration of the three-way catalyst is made in such a case, there is the possibility of an erroneous diagnosis being made, and therefore the deterioration diagnosis for the three-way catalyst is avoided.

In the case of F4=1 at the catalyst deterioration diagnosis avoiding flag F4, the frequency of the control condition shifting to the range for stopping the fuel supply is generally equal to the frequency of the control condition shifting to the range for increasing the amount of the fuel supply under the engine operating condition in which the temperature of the three-way catalyst 24 becomes high. In such a case, if the capability of the three-way catalyst 24 has been lowered, the three-way catalyst 24 is assumed to be deteriorated permanently, so that the deterioration diagnosis for the three-way catalyst 24 should be carried out, indicating the establishment of the diagnosis condition for diagnosing the deterioration of the three-way catalyst 24. In other words, at the steps 39 and 40, setting the catalyst deterioration diagnosis avoiding flag F4 is to avoid the deterioration diagnosis for the three-way catalyst 24.

Meanwhile, the flow goes to a step S41 at which the above-mentioned air-fuel ratio feedback correction coefficient $\alpha$ is clamped at $\alpha=1$, and thereafter the flow is terminated.

Figure 3:
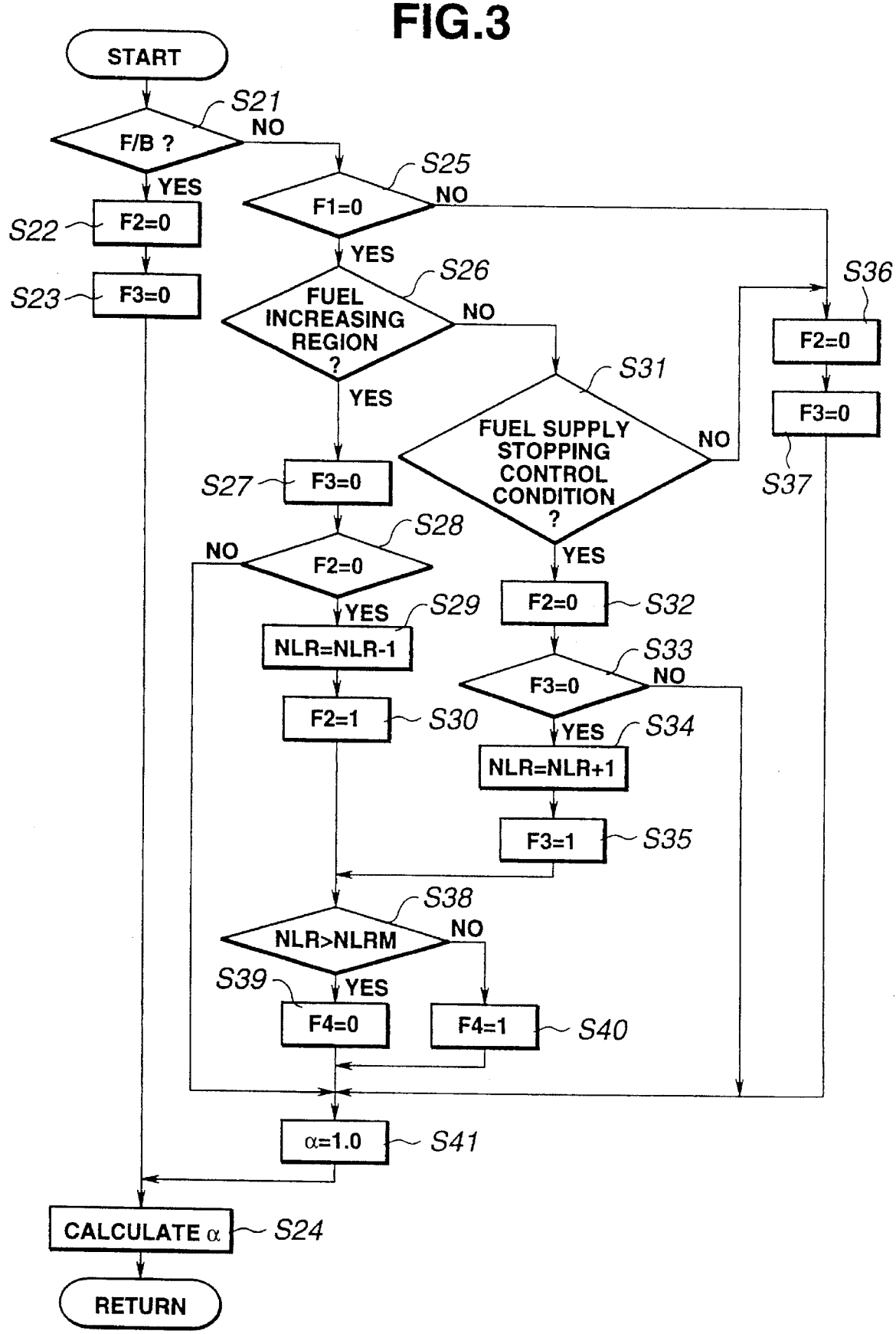
FIG. 3 is a flowchart of an example of a sub-routine of the catalyst deterioration diagnosis avoiding judgment program.

Thus, according to this embodiment including the above example of the deterioration diagnosis avoiding judgment sub-routine of FIG. 3, in case that the frequency of the control condition shifting to the range for stopping the fuel supply is larger by not less than the predetermined value NLR than the frequency of the control condition shifting to the range for increasing the amount of the fuel supply under the engine operating condition in which the temperature of the three-way catalyst 24 becomes high, it is assumed that the three-way catalyst 24 is subjected to the high temperature and lean atmosphere so that the capability of the three-way catalyst 24 is temporarily lowered (such a lowering in capability of the three-way catalyst can be restored by exposing the three-way catalyst 24 to a high temperature and rich atmosphere). In such a case, the deterioration diagnosis for the three-way catalyst 24 is avoided thereby preventing an erroneous judgment of the temporary capability lowering as a complete and permanent deterioration (capability lowering) of the three-way catalyst 24.

It will be appreciated that, according to the above embodiment, since the rate of the control condition shifting is calculated by making decrement or increment on the frequency count value NLR, the consumption amount of a memory in connection with such a calculation is considerably less and therefore the system of the present invention is simplified while lowering production cost.

Next, another example of the deterioration diagnosis avoiding judgment sub-routine of the deterioration diagnosis avoiding judgment program will be discussed with reference to a flowchart of FIGS. 4 and 5.

At a step S51, a judgment is made as to whether the engine operating condition flag F1 is at F1=0 or not. The flag F1 was memorized in the main routine of FIG. 2 of the deterioration diagnosis avoiding judgment program. In case of F1=0, it is assumed that the engine operating condition is within the range at which the temperature of the three-way catalyst 24 becomes high, and therefore a flow goes to a step S52.

At the step S52, a judgment is made as to whether the engine operating condition or control condition is within the fuel increasing region or range for increasing the amount of the fuel supply to the fuel injector valve 15, in accordance with the basic fuel injection amount Tp (as the engine load) and the engine speed Ne. In case of the judgment result of the present engine operating condition being within the fuel increasing region (or in case of YES), the flow goes to a step S53 at which a judgment is made as to whether a lean time count flag F6 is at F6=0 or not. This flag F6 indicates whether counting (adding) a lapsed time after the condition shifts to the range for stopping the fuel supply is made or not. It will be understood that "lean time" means a time for which the air-fuel ratio of exhaust gas upstream of the catalyst 24 is lean (in fuel) relative to the stoichiometric air-fuel ratio.

Here, in case of F6=0 of the flag F6, the temperature of the catalyst 24 has been high until a time immediately before the present time, and the control condition is within the range for stopping the fuel supply. In this case, a lean air-fuel ratio is assumed to be kept in exhaust gas upstream of the catalyst 24 until fuel is actually supplied to the fuel injector valve 15 even if the control condition shifts to other ranges, and therefore the lean time is counted in case that the above-mentioned present control condition continues or shifts to other control conditions. In case of F6=1, the temperature of the catalyst 24 has not been high until a time immediately before the present time, or the control condition is within the range at which the fuel supply to the fuel injector valve 15 is not stopped. In this case, the fuel supply has not been still stopped at the present time, and therefore the lean time is not counted regardless of the present control condition.

In other words, in case of the judgment result of F6=0, it is assumed that although the present control condition has been within the range for increasing the amount of the fuel supply, the control condition was within the range for stopping the fuel supply until a time immediately before the present time. Accordingly, in this case, counting the lapsed time after the control condition shifting to the range for stopping the fuel supply should be counted but has not been carried out. Accordingly, the flow goes to a step S54 at which an increment is made by DT on the time count value TLR (TLR=TLR+DT).

In other words, at the step S54, the lapsed time after the control condition shifts to the range for stopping the fuel supply is calculated. The lapsed time corresponds to a period at which a control for stopping the fuel supply is carried out.

At a step S55, F6=1 is set at the lean time count flag F6 in order to prevent re-counting the lapsed time for which the control condition shifts from the range for stopping the fuel supply to the range for increasing the amount of the fuel supply, since the lapsed time was counted at the step S54.

At the step S53, in case of the judgment result of F6=1 (or in case of NO), the lapsed time for which the control condition shifts from the range for stopping the fuel supply to the range for increasing the amount of the fuel supply is not re-counted since the lapsed time was counted at the step S54. Accordingly, the flow goes to a step S56 bypassing the steps 54 and 55.

At a step S56, a judgment is made as to whether a rich time count flag F5 is at F5=0 or not. This flag F5 indicates whether counting (adding) a lapsed time after the control condition shifts to the range for increasing the amount of the fuel supply is made or not. It will be understood that "rich time" means a time for which the air-fuel ratio of exhaust gas upstream of the catalyst 24 is rich (in fuel) relative to the stoichiometric air-fuel ratio.

Here, in case of F5=0 of the flag F5, the temperature of the catalyst 24 has been high until a time immediately before the present time, and the control condition is within the range for increasing the amount of the fuel supply. In this case, a rich air-fuel ratio is assumed to be kept in exhaust gas upstream of the catalyst 24 until the fuel supply to the fuel injector valve 15 is actually stopped even if the control condition shifts to other ranges, and therefore the rich time is counted in case that the above-mentioned present control condition continues or shifts to other control conditions. In case of F6=1, the temperature of the catalyst 24 has not been high until a time immediately before the present time, or the control condition is within the range at which the amount of the fuel supply to the fuel injector valve 15 is not increased. In this case, the amount of the fuel supply has not been still increased at the present time, and therefore the rich time is not counted regardless of the present control condition.

In other words, in case of the judgment result of F5=0, it is assumed that although the present control condition has been within the range for increasing the amount of the fuel supply, the temperature of the catalyst was high and the control condition was within the range for increasing the amount of the fuel supply until a time immediately before the present time. Accordingly, in this case, counting the lapsed time after the control condition shifting to the range for increasing the amount of the fuel supply should be counted but has not been carried out. Accordingly, the flow goes to a step S57 at which a decrement is made by DT on the time count value TLR (TLR=TLR–DT).

In other words, at the step S57, the lapsed time after the control condition shifts to the range for increasing the amount of the fuel supply is calculated. The lapsed time corresponds to a period at which a control for increasing the amount of the fuel supply is carried out.

At the step S56, in case of the judgment result of F5=1 (or in case of NO), although the present control condition has been within the range for increasing the amount of the fuel supply, the temperature of the catalyst was not high or the control condition was within the range at which the amount of the fuel supply is not increased until a time immediately before the present time. Accordingly, the flow goes to a step S58. At the step S58, the present control condition is within the range for increasing the amount of the fuel supply, and counting the lapsed time after the control condition shifting to the range for increasing the amount of the fuel supply should be initiated to be counted. Consequently, F5=0 is set at the rich time count flag F5.

At the step S52, in case of such a judgment result that the engine operating condition or control condition is not within the fuel increasing region or range (or in case of NO), the flow goes to a step S59 at which a judgment is made as to whether the control condition is within the range for stopping the fuel supply, or not.

In case of the judgment result of the present control condition being within the range for stopping the fuel supply (or in case of YES), the flow goes to a step S60 at which a judgment is made as to whether the rich time count flag F5 is at F5=0 or not to know whether counting (adding) the lapsed time after the control condition shifting to the range for increasing the amount of the fuel supply should be made or not. Accordingly, in case of the judgment result of F5=0, it is assumed that although the present control condition has been within the range for increasing the amount of the fuel supply, the control condition was within the range for increasing the amount of the fuel supply until a time immediately before the present time. Accordingly, in such a case, counting the lapsed time after the control condition shifting to the range for increasing the amount of the fuel supply should be counted but has not been carried out. Accordingly, the flow goes to a step S61 at which a decrement is made by DT on the time count value TLR (TLR=TLR−DT). Also at the step S61, the lapsed time after the control condition shifts to the range for increasing the amount of the fuel supply is calculated. The lapsed time corresponds to a rate (ratio) at which a control for increasing the amount of the fuel supply is carried out.

At a step S62, the lapsed time for which the control condition shifts from the range for increasing the amount of the fuel supply to the range for stopping the fuel supply was counted at the step S61, and therefore F5=1 is set at the rich time count flag F5 in order to prevent re-counting the lapsed time.

At the step S60, in case of the judgment result of F5=1 (or in case of NO), the lapsed time for which the control condition shifts from the range for increasing the amount of the fuel supply to the range for stopping the fuel supply is to be not re-counted since the lapsed time was counted at the step S54. Accordingly, the flow goes to a step S63 bypassing the steps 61 and 62.

At the step S63, in case of the judgment result of F6=0 at the lean time count flag F6, it is assumed that although the present control condition has been within the range for stopping the fuel supply, the control condition was within the range for stopping the fuel supply until a time immediately before the present time. Accordingly, in this case, counting the lapsed time after the control condition shifting to the range for stopping the fuel supply should be counted but has not been carried out. Accordingly, the flow goes to a step S64 at which an increment is made by DT on the time count value TLR (TLR=TLR+DT). In other words, at the step S64, the lapsed time after the control condition shifts to the range for stopping the fuel supply is calculated. The lapsed time corresponds to a rate (ratio) at which a control for stopping the fuel supply is carried out.

As shown in steps 54 and 57 and the steps 61 and 64, the decrement by DT is made on the time count value TLR in case that the control condition for increasing the amount of the fuel supply is continuing, whereas the increment by DT is made on the time count value TLR in case that the control condition for stopping the fuel supply is continuing.

At the step S63, in case of the judgment result of F6=1 at the lean time count flag F6 (or in case of NO), although the present control condition has been within the range for stopping the fuel supply, the control condition was within the range at which the fuel supply is not stopped, until a time immediately before the present time. In such a case, the control condition is within the range for stopping the fuel supply at the present time, and therefore the flow goes to a step S65. At the step S65, the present control condition is within the range for stopping the fuel supply. Counting the lapsed time after the control condition shifting to the range for stopping the fuel supply should be initiated from a next time calculation, and therefore F6=0 is set at the lean time count flag F6.

At a step S66, a judgment is made as to whether the time count value upon decrement at the step S57, S61 or upon increment at the step S54, S64 is TLR>TLRM (TLRM is a predetermined time value) or not. In case of YES, the flow goes to a step S67 at which "0" is set at a catalyst deterioration diagnosis avoiding flag F7. In case of NO, the flow goes to a step S68 at which "1" is set at the catalyst deterioration diagnosis avoiding flag F7.

Here, in case of F7=0 at the catalyst deterioration diagnosis avoiding flag F7, the time for which the control condition for stopping the fuel supply continues is larger by not less than the predetermined value TLRM than the time for which the control condition for increasing the amount of fuel supply continues under the engine operating condition in which the temperature of the three-way catalyst 24 becomes high. In other words, in such a case, the three-way catalyst 24 is high in temperature and subjected to a lean atmosphere (having a lean air-fuel ratio relative to the stoichiometric air-fuel ratio), in which the capability of the three-way catalyst 24 is temporarily lowered. However, since such a capability lowering is merely temporary, the capability of the three-way catalyst can be restored by exposing the three-way catalyst 24 to a high temperature and a rich atmosphere (having a rich air-fuel ratio relative to the stoichiometric air-fuel ratio). It will be understood that if the diagnosis for deterioration of the three-way catalyst is made in such a case, there is the possibility of an erroneous diagnosis being made, and therefore the deterioration diagnosis for the three-way catalyst is avoided.

In the case of F7=1 at the catalyst deterioration diagnosis avoiding flag F7, the time for which the control condition for stopping the fuel supply continues is generally equal to the time for which the control condition for increasing the amount of the fuel supply continues under the engine operating condition in which the temperature of the three-way catalyst 24 becomes high. In such a case, if the capability of the three-way catalyst 24 has been lowered, the three-way catalyst 24 is assumed to be deteriorated permanently, so that the deterioration diagnosis for the three-way catalyst 24 should be carried out, indicating the establishment of the diagnosis condition for diagnosing the deterioration of the three-way catalyst 24. In other words, at the steps 67 and 68, setting the catalyst deterioration diagnosis avoiding flag F4 is to avoid the deterioration diagnosis for the three-way catalyst 24.

At the step S51, in case of the judgment result of F1=1, the engine operating condition is not within the range at which the temperature of the three-way catalyst 24 becomes high. At the step S59, in case of the present control condition or engine operating condition is not within the fuel increasing region or range (or in case of NO), the present control condition is not within the range for increasing the amount of the fuel supply or not within the range for stopping the fuel supply.

However, there are a case in which the engine operating condition has shifted from the range at which the temperature of the three-way catalyst 24 becomes high to the range at which the temperature of the catalyst 24 does not become high upon the fact that the engine operating condition was within the former range until a time immediately before the present time, and a case in which the present engine operating condition is also within the range at which the temperature of the three-way catalytic converter become high upon the fact that the control condition was within the range for increasing the amount of the fuel supply or within the range for stopping the fuel supply until a time immediately before the present time. Also in these cases, the lapsed time before the condition shifting to the present condition is counted.

Accordingly, at a step S69, a judgment is made as to whether the rich time count flag F5 is at F5=0 or not to know whether counting (adding) the lapsed time after the control condition shifting to the range for increasing the amount of the fuel supply should be made or not. Thus, in case of the judgment result of F5=0, it is assumed that although the present control condition has not been within the range at which the temperature of the catalyst 24 becomes high, the control condition was within the range at which the temperature of the catalyst 24 becomes high and the amount of the fuel supply is increased until a time immediately before the present time. Accordingly, in such a case, counting the lapsed time after the control condition shifting to the range for increasing the amount of the fuel supply should be counted but has not been carried out. Accordingly, the flow goes to a step S70 at which a decrement is made by DT on the time count value TLR (TLR=TLR–DT). Also at the step S70, the lapsed time after the control condition shifts to the range for increasing the amount of the fuel supply is calculated. The lapsed time corresponds to a period at which a control for increasing the amount of the fuel supply is carried out.

At a step S71, F5=1 is set at the rich time count flag F5 in order to prevent re-counting the lapsed time, since the lapsed time for which the control condition shifts from the range for increasing the amount of the fuel supply to the range for stopping the fuel supply was counted at the step S70. At the step 869, in case of the judgment result of F5=1 (on in case of NO), the flow goes to a step 72 at which at which a judgment is made as to whether a lean time count flag F6 is at F6=0 or not to know as to whether the lapsed time after the control condition shifting to the range for stopping the fuel supply is to be counted (added) or not. Accordingly, in case of the judgment result of the lean time count flag F6=0, it is assumed that although the present control condition has not been within the range at which the temperature of the catalyst 24 becomes high, the control condition was within the range at which the temperature of the catalyst 24 became high and the fuel supply was stopped until a time immediately before the present time. Accordingly, in such a case, counting the lapsed time after the control condition shifting to the range for increasing the amount of the fuel supply should be counted but has not been carried out. Accordingly, the flow goes to a step 873 at which an increment is made by DT on the time count value TLR (TLR=TLR+DT). Also at the step S73, the lapsed time after the control condition shifting to the range for stopping the fuel supply is calculated. The lapsed time corresponds to a period at which a control for stopping the fuel supply is carried out.

At a step 74, the lapsed time for which the control condition shifts from the range for stopping the fuel supply to the range for increasing the amount of the fuel supply was counted at the step S73, and therefore F6=1 is set at the rich time count flag F6 in order to prevent re-counting the lapsed time.

At a step 75, a judgement is made as to whether the time count value upon decrement at the step S70 or upon increment at the step S73 is TLR>TLRM (TLRM is the predetermined time value) or not. In case of YES, the flow goes to a step S76 at which "0" is set at a catalyst deterioration diagnosis avoiding flag F7. In case of NO, the flow goes to a step S77 at which "1" is set at the catalyst deterioration diagnosis avoiding flag F7. Thus, the function of setting the catalyst deterioration avoiding flag F7 at the steps 76 and 77 serves to avoid the deterioration diagnosis of the three-way catalyst 24.

At a step S78, a judgment is made as to whether the engine operating condition within a range at which the air-fuel ratio feedback control can be carried out, or not. In case of the judgment result of the engine operating condition being within the range (or in case of YES), the flow goes to a step S79.

At a step 79, the air-fuel ratio feedback correction coefficient α is calculated under a proportional-plus-integral control so as to cause the air-fuel ratio detected by the first air-fuel ratio sensor 22 to approach the target air-fuel ratio (stoichiometric air-fuel ratio) thereby accomplishing the air-fuel ratio feedback control. Thereafter, the flow is terminated.

At the step 78, if the judgment result is that the engine operating condition is not within the range at which the air-fuel ratio feedback control is carried out (or in case of the judgment result of NO), it is assumed that it is possible to further judge the diagnosis condition, and the flow goes to a step S80. At the step S80, the above-mentioned air-fuel ratio feedback correction coefficient α is clamped at α=1, and thereafter the flow is terminated.

Figure 4:
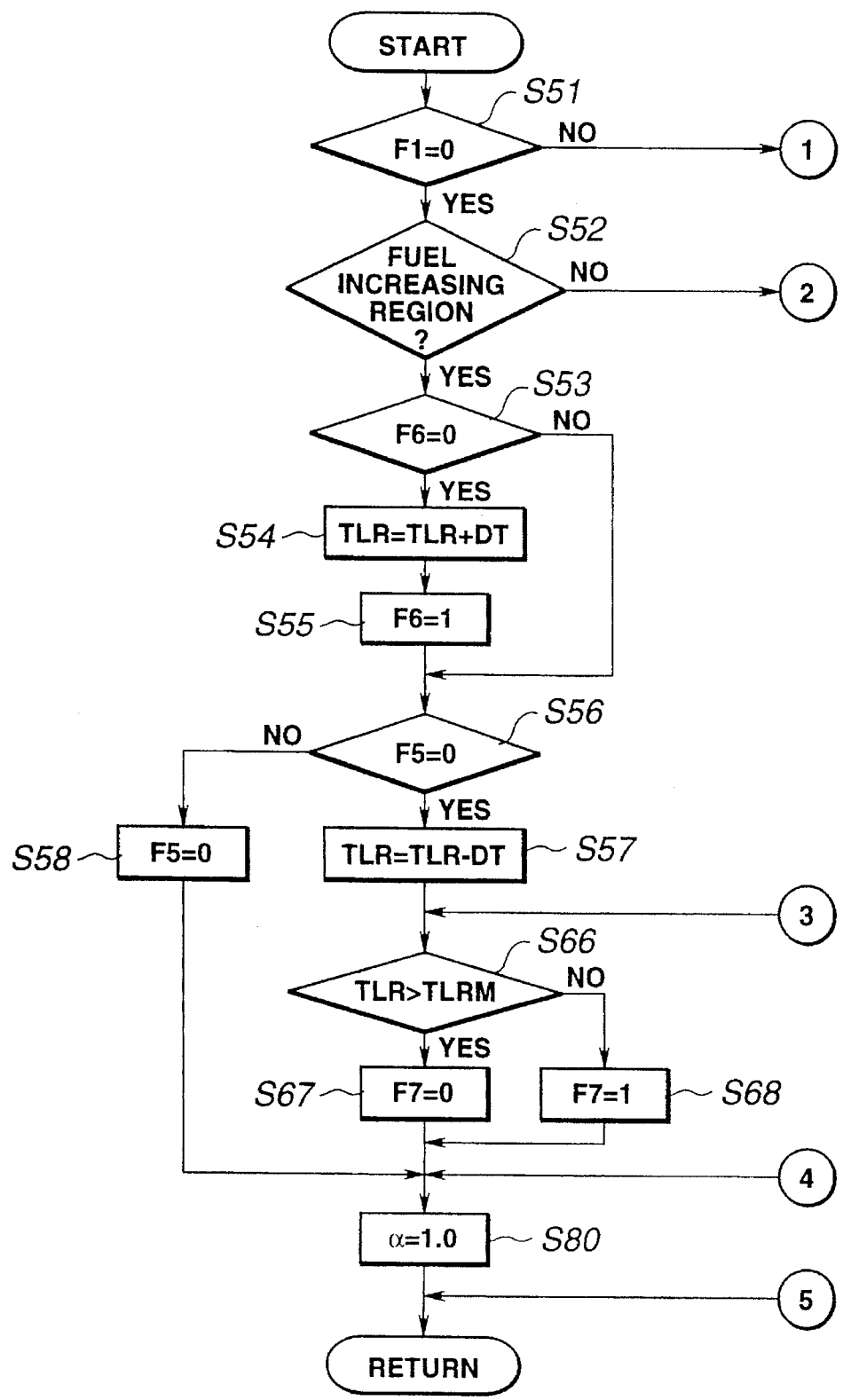
FIGS. 4 and 5 are a flowchart of another example of the sub-routine of the catalyst deterioration diagnosis avoiding judgment program.
Figure 5:
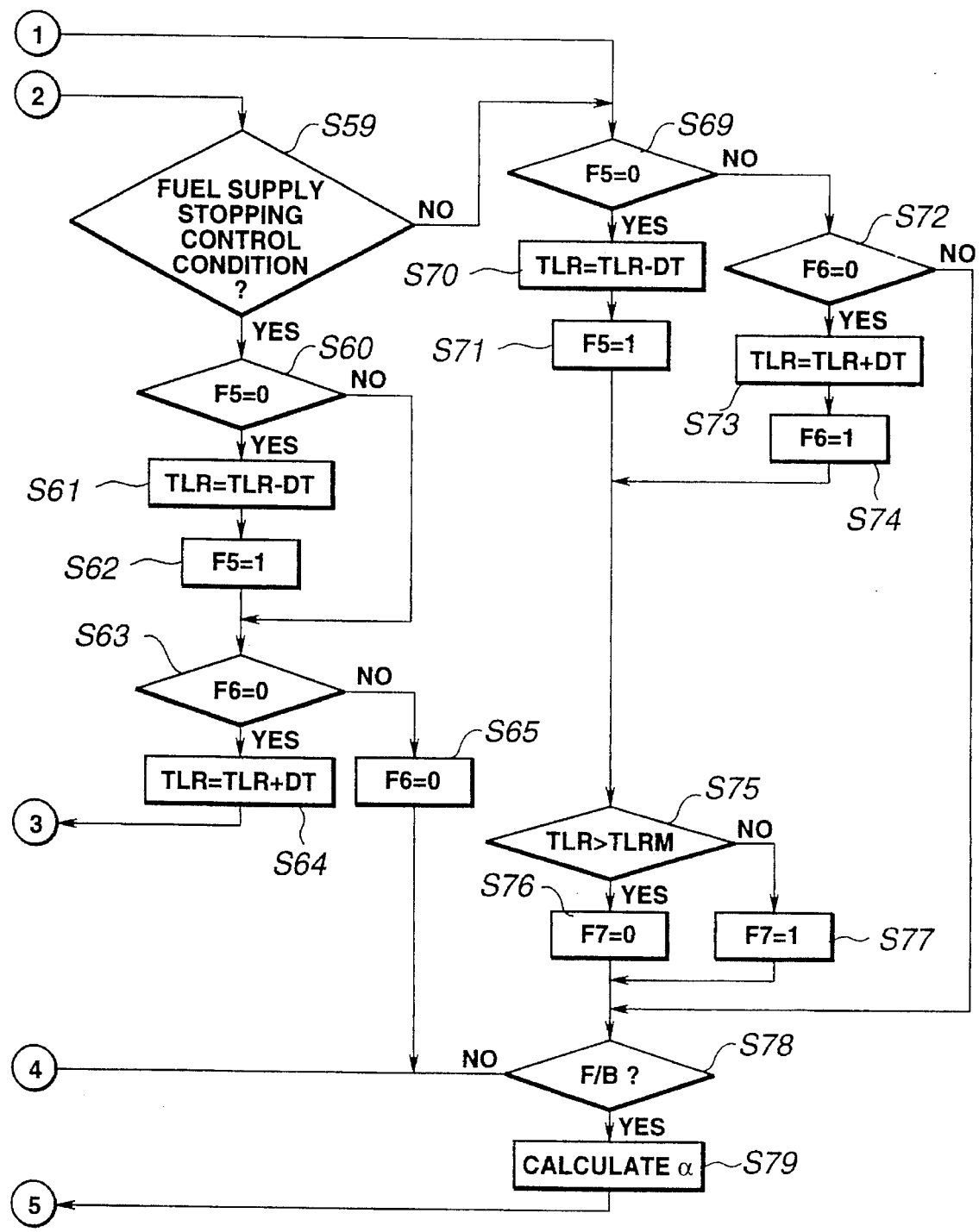

Thus, according to the embodiment including the above example of the deterioration diagnosis avoiding judgment subroutine of FIGS. 4 and 5, in case that the time for which the control condition for stopping the fuel supply continues is longer by not less than the predetermined value TLRM than the time for which the control condition for increasing the amount of the fuel supply continues under the engine operating condition in which the temperature of the three-way catalyst 24 becomes high, it is assumed that the three-way catalyst 24 is subjected to the high temperature and lean atmosphere so that the capability of the three-way catalyst 24 is temporarily lowered (such a lowering in capability of the three-way catalyst can be restored by exposing the three-way catalyst 24 to a high temperature and rich atmosphere). In such a case, the deterioration diagnosis for the three-way catalyst 24 is avoided thereby preventing an erroneous judgment of the temporary capability lowering as a complete and permanent deterioration (capability lowering) of the three-way catalyst 24.

It will be appreciated that, according to this embodiment including the sub-routine of FIGS. 4 and 5, since the rate of the control condition shifting is calculated by making decrement or increment on the time count value NLR, the time for which the three-way catalyst 24 is subjected to a predetermined control condition can be calculated. Therefore, the control can more accurately take account of the effect of the control condition to which the three-way catalyst is actually subjected, thereby making it possible to further accurately obtain the state of catalyst deterioration.

What is claimed is:

1. A control system for an internal combustion engine provided with an exhaust gas purifying catalyst in an exhaust gas passageway of the engine, said control system comprising:

means for diagnosing a deterioration of the catalyst;

means for detecting a predetermined engine operation condition at which a temperature of the catalyst becomes high;

means for calculating a first period at which a control for stopping fuel to be supplied to the engine is made;

means for calculating a second period at which a control for increasing an amount of fuel to be supplied to the engine is made; and means for avoiding an operation of said diagnosing means when a deviation between said first and second periods is not less than a predetermined value under said predetermined engine operating condition.

2. A control system as claimed in claim 1, wherein said avoiding means includes means for avoiding the operation of said diagnosing means when said first period is larger by not less than said predetermined value than said second period under said predetermined engine operating condition.

3. A control system as claimed in claim 2, wherein said first and second periods are time periods.

4. A control system as claimed in claim 3, wherein said first period calculating means includes means for calculating a first frequency at which an engine operating condition shifts to a range for stopping the fuel to be supplied to the engine; and said second period calculating means includes means for calculating a second frequency at which the engine operating condition shifts to a range for increasing the amount of fuel to be supplied to the engine.

5. A control system as claimed in claim 4, wherein said avoiding means includes means for avoiding the operation of said diagnosing means when said first frequency is larger by not less than a predetermined value than said second frequency under said predetermined engine operating condition.

6. A control system as claimed in claim 1, wherein the exhaust gas purifying catalyst is a three-way catalyst for oxidizing carbon monoxide and hydrocarbons and for reducing nitrogen oxides.

7. A control system as claimed in claim 1, further comprising an air-fuel ratio sensor for detecting an air-fuel ratio of exhaust gas in the exhaust gas passageway upstream-of the exhaust gas purifying catalyst.

8. A control system as claimed in claim 1, further comprising means for controlling an air-fuel ratio in the exhaust gas passageway upstream of said exhaust gas purifying catalyst, to a target level.

9. A control system as claimed in claim 8, wherein said air-fuel ratio controlling means includes means for changing said first and second periods.

10. A control system as claimed in claim 1, further comprising a fuel injector valve to inject fuel in an intake air passageway connected to the engine, at least both said control for stopping the fuel and said control for increasing the amount of fuel are applied to said fuel injector valve.

11. A control system as claimed in claim 3, wherein said first period calculating means includes means for calculating a first time for which an engine operating condition for stopping the fuel to be supplied to the engine continues; and said second period calculating means includes means for calculating a second time for which the engine operating condition for increasing an amount of the fuel to be supplied to the engine continues.

12. A control system as claimed in claim 11, wherein said avoiding means includes means for avoiding the operation of said diagnosing means when said first time becomes larger by not less than a predetermined value than said second time under said predetermined engine operating condition.

13. A control system for an internal combustion engine provided with an exhaust gas purifying catalyst in an exhaust gas passageway of the engine, said control system comprising:

a catalyst deterioration diagnosing device;

first sensor for detecting an engine operating condition at which a temperature of the catalyst becomes high;

a micro-computer for calculating a first period at which a control for stopping fuel to be supplied to the engine is made, and a second period at which a control for increasing an amount of fuel to be supplied to the engine is made;

wherein, operation of said diagnosing device is avoided when a deviation between said first and said second periods is not less than a predetermined value during said engine operating condition.

14. A control system as claimed in claim 13, wherein said first period is longer than said second period during said engine operating condition.

15. A control system as claimed in claim 13, wherein said first period corresponds to a first frequency at which an engine operating condition shifts to a condition for stopping the fuel to be supplied to the engine; and said second period corresponds to a second frequency at which the engine operating condition shifts to a condition for increasing the amount of fuel to be supplied to the engine.

16. A control system as claimed in claim 13, further comprising:

an air-fuel ratio sensor for detecting an air-fuel ratio of exhaust gas in the exhaust gas passageway upstream of the exhaust gas purifying catalyst; and a fuel injector valve to inject fuel in an intake air passageway connected to the engine;

wherein said control for stopping the fuel and said control for increasing the amount of fuel are applied to said fuel injector valve;

wherein said micro-computer controls said air-fuel ratio to a target level.

\* \* \* \* \*